(12) United States Patent
Nookula et al.

(10) Patent No.: US 11,544,577 B1
(45) Date of Patent: Jan. 3, 2023

(54) ADAPTABLE FILTERING FOR EDGE-BASED DEEP LEARNING MODELS

(71) Applicant: Amazon Technologies, Inc., Seattle, WA (US)

(72) Inventors: Nagajyothi Nookula, Seattle, WA (US); Poorna Chand Srinivas Perumalla, Seattle, WA (US); Aashish Jindia, San Francisco, CA (US); Eduardo Manuel Calleja, San Francisco, CA (US); Vinay Hanumaiah, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1285 days.

(21) Appl. No.: 15/881,569

(22) Filed: Jan. 26, 2018

(51) Int. Cl.
*G06N 5/02* (2006.01)
*G06N 20/00* (2019.01)

(52) U.S. Cl.
CPC ............... *G06N 5/02* (2013.01); *G06N 20/00* (2019.01)

(58) Field of Classification Search
CPC . G06N 5/02; G06N 20/00; G06K 9/66; G06T 1/20
See application file for complete search history.

(56) References Cited

U.S. PATENT DOCUMENTS

| 6,363,161 | B2* | 3/2002 | Laumeyer | G06V 10/443 382/104 |
| 9,225,897 | B1* | 12/2015 | Sehn | G06K 9/00671 |
| 2004/0167964 | A1* | 8/2004 | Rounthwaite | G06Q 10/107 709/206 |
| 2009/0119238 | A1* | 5/2009 | Amini | G06F 9/5027 706/46 |
| 2020/0218959 | A1* | 7/2020 | Srinivasa | G06N 3/049 |

* cited by examiner

*Primary Examiner* — Daniel T Pellett
(74) *Attorney, Agent, or Firm* — Nicholson De Vos Webster & Elliott LLP (57) ABSTRACT

Techniques for utilizing adaptable filters for edge-based deep learning models are described. Filters may be utilized by an edge electronic device to filter elements of an input data stream so that only a subset of the elements are used as inputs to a machine learning model run by the electronic device, enabling successful operation despite the input data stream potentially being generated at a higher rate than a rate in which the ML model can be executed. The filter can be a differential-type filter that generates difference representations between consecutive elements of the data stream to determine which elements are to be passed on for the ML model, a "smart" filter such as a neural network trained using outputs from the ML model allowing the filter to "learn" which elements are the most likely to be of value to be passed on, or a combination of both.

20 Claims, 9 Drawing Sheets

ADAPTABLE FILTERING FOR EDGE-BASED DEEP LEARNING MODELS

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. While the high-level view of machine learning sounds simple—e.g., provide training data to a computer, to allow the computer to automatically learn from the training data to generate a model that can make predictions for other data—implementing machine learning techniques in practice can be tremendously difficult.

This difficulty is partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for utilizing adaptable filters for edge-based deep learning models are described. According to some embodiments, one or more filters may be utilized by an electronic device to filter elements of a data stream so that only a subset of the elements are used as inputs to a machine learning (ML) model run by the electronic device, thus enabling the electronic device to operate on a data stream that may be generated at a higher rate than the rate in which the electronic device can execute the ML model.

In some embodiments, the filter can be a differential-type filter that generates difference representations between consecutive elements of a data stream to determine which elements are to be passed on to be used as inputs for the ML model. In some embodiments, the filter can be a "smart" filter utilizing a ML-type model such as a neural network that can be trained using outputs from the ML model, allowing the filter to "learn" which elements of the data stream are the most likely to be of value to be passed on. In some embodiments, a set of filters can be used, such as a differential filter during a first period of time (in which a second, smart filter is trained using feedback from the ML model), and at a later point in time the filtering can be switched from the differential filter to the smart filter, e.g., when the smart filter is sufficiently trained.

Accordingly, in some embodiments, an "edge" electronic device with relatively limited resource capabilities (e.g., processing power, memory) can execute a ML model itself (e.g., to generate interferences) despite not being able to run the model at the same "rate" of the data stream being generated, and thus, in some embodiments such a device need not send the elements of the data stream to an external location (e.g., a cloud provider network, or some other remote electronic device(s)) for inference, which would require sufficient network/power resources, continual network connectivity, time delay tolerance, etc.

Complex machine learning models have typically been centrally (e.g., within a cloud network) trained and utilized, especially when dealing with models involving data from "edge" devices that tend to have limited processing capabilities. For example, a central server (or servers) may aggregate a potentially large number of data streams (from one or many sources) and run one ML model, e.g., to determine a consistent representation of the state of a space, identify things or events within a video and/or audio stream, etc. These actions are typically done using a cloud environment that has immense processing power to be able to centralize the data and analyze it, due to the large cost of running the ML models (e.g., "deep" models such as neural networks) commonly used to effectively model this data and the need to be able to run the model (e.g., generate inferences) at a fast-enough rate to handle the often-large stream(s) of incoming data for the model.

In contrast, a recent trend referred to as "fog computing" instead attempts to shift operations away from a centralized location and to closer to users or data. For example, common fog computing architectures use collaborative end-user clients and/or near-user edge devices to carry out a substantial amount of storage (rather than stored primarily in cloud data centers), communication (rather than routed over the internet backbone), control, configuration, measurement and management, etc. However, implementing systems using such an architecture is difficult for a variety of reasons, such as a relative lack of processing, memory, or networking capabilities, etc., present in these "edge" devices of fog computing architectures.

However, as indicated above, in some embodiments an edge electronic device can locally utilize a ML model despite potentially not having the resource capability (e.g., processing, memory, bus, etc.) to execute the ML model for each data stream element captured by a sensor device (that is part of the edge electronic device, or coupled with the edge electronic device). Instead, in some embodiments, elements of the data stream that have no value for the ML model can be intelligently discarded with minimal resource utilization requirements, allowing the effective rate of data stream elements needing to be processed (by the model) to be reduced to a rate that the edge device can handle without losing predictive/inference ability. Moreover, in some embodiments, the filter(s) can be flexibly configured by an end user to vary or tune what data stream elements are provided to the ML model, and in some embodiments, the filter(s) can automatically improve its filtering capabilities by adjusting itself based on feedback from the ML model.

Figure 1:
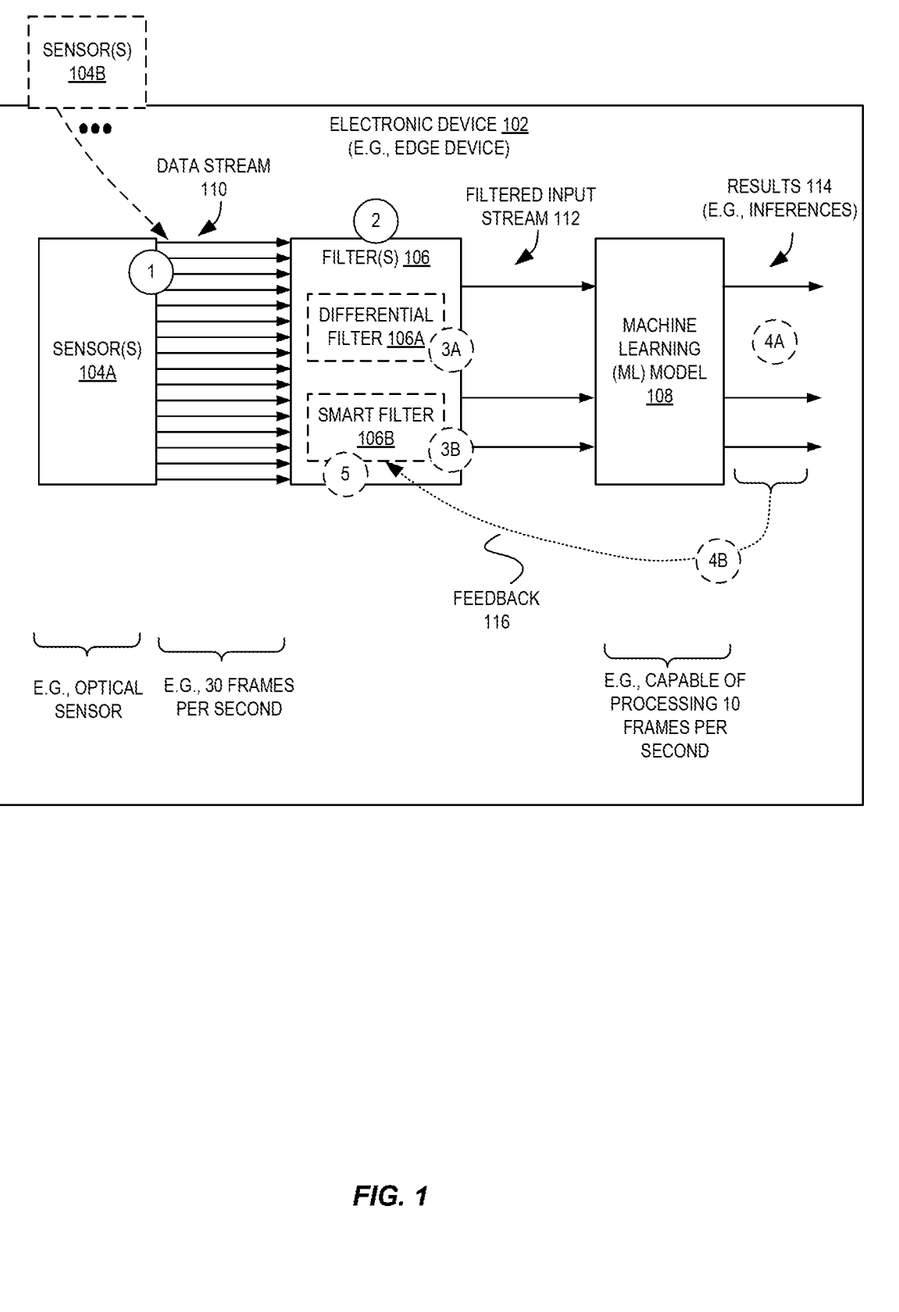
FIG. 1 is a diagram illustrating an environment including an edge electronic device utilizing an adaptable filter for edge-based deep learning models according to some embodiments.

FIG. 1 is a diagram illustrating an environment including an edge electronic device 102 utilizing one or more adaptable filters 106 for edge-based deep learning models according to some embodiments. In other modern systems involving the use of sensors (e.g., sensors 104A-104B) to generate data to be provided to ML models (such as consumer-level "smart" cameras, doorbells, etc.), these systems may implement some sort of extremely simplistic filtering logic in the electronic device (having the sensor) to eliminate "uninteresting" sensor data (e.g., video frames that are no different than previously-captured video frames), and then send any non-filtered sensor data to a cloud provider network to perform inference (e.g., execute a ML model using the non-filtered sensor data as inputs to infer something such as the presence of a person, object, motion, etc.). This configuration has become widespread for a variety of reasons, although a primary reason is that such edge devices have extremely limited resources available for executing ML models. For example, an edge device may have an extremely limited amount of processing and/or memory resources available, may be battery powered, etc., and thus these devices tend to be optimized simply for the mere collection (and transmission) of sensor data.

In contrast, embodiments disclosed herein can perform inference on such edge devices—and not in remote, provider networks—via use of one or more filters 106 and a ML model 108 within the compute device 102. Thus, embodiments can completely avoid the need for a "cloud" backend if desired and the costs associated therewith (e.g., transmission and processing delays, configuration, network availability, etc.).

In some embodiments, an exemplary electronic device 102 includes one or more sensors 104A-104B (or "sensor devices") that may be a part of the electronic device (shown as sensor(s) 104A) or otherwise coupled with the electronic device (e.g., physically via a Universal Serial Bus (USB), via a wireless communications interface, etc.) as shown as sensor(s) 104B. The sensors 104A-104B can "sense" environmental characteristics and generate sensor data—e.g., images, audio data, numeric readings, etc. As one example, a sensor 104A may comprise an optical sensor stack for a camera, which may include a lens, a sensor unit, and an image signal processor (ISP), etc. Many other types of sensors exist that can be utilized that are known to those of skill in the art, and which employ different types of sensor components, such as microphones, particle sensors, temperature sensors, proximity sensors, etc.

As shown in FIG. 1, a sensor 104A may thus comprise a sensor stack including one or more sensing components able to sense physical environmental characteristics such as light, sound, electrical signals, particles, etc., and generate digital sensor data (at circle '1') indicative of those sensed characteristics in the form of a plurality of elements of a data stream 110. The sensor(s) 104A-104B may generate the elements of the data stream 110 at a particular rate based on the capabilities of the sensors. As shown in FIG. 1, we assume that the data stream 110 is generated by an optical sensor that provides thirty (30) frames per second of image/video data, though in various embodiments the sensor or sensors involved can be of various types and produce various types of data stream elements (e.g., multimodal data—audio, video, or text.)

However, as introduced herein, it is typically relatively expensive to execute a ML model 108 and thus, for a particular electronic device 102, the rate of running the model (e.g., to perform inference) may be less than the rate of which elements of the data stream 110 are provided, and thus there may often be a discrepancy between the input data stream rate and the model's inference rate. This can be due to limitations of the capabilities of the electronic device for computation, the size/complexity of the ML model 108, etc. In this exemplary case, we stipulate that the electronic device 102 can execute the ML model 108 at a rate of ten (10) frames per second, which is less than the rate of thirty (30) frames per second of the data stream 110. Such a mismatch is problematic if it exists for any period of time, as it may cause memory storage locations (e.g., implementing a queue of data stream elements to be processed by the ML model) to overflow, inference results to be significantly delayed from the time in which the corresponding data stream elements were captured, etc.

In some embodiments, the electronic device 102 uses one or more filters 106, at circle '2', to reduce the amount of data stream elements 110 that are provided to the ML model 108. In various embodiments one or multiple filters 106 and/or types of filters can be utilized to reduce the quantity of elements of the data stream 110 that are provided to the ML model 108 as a filtered input stream 112. For example, in some embodiments a differential filter 106A can be used at circle '3A', and in some embodiments, a smart filter 106B can be used at circle '3B', each of which yielding a filtered input stream 112 that can be processed by the ML model 108, e.g., to yield corresponding results 114 (e.g., inferences) at circle '4A'. Although not illustrated, the electronic device 102 can perform different responsive actions based on the particular results 114, e.g., store all of them or ones of them satisfying a condition to a local or remote storage medium, transmit a notification to another device or system (e.g., upon a particular result 114 being found) indicating that the particular result was detected, enable additional processing related to the data stream 110 (e.g., seeking additional detail on a detected event), cause a signal to be generated/emitted by the electronic device 102 such as a visual or audio indicator (e.g., a light and/or a sound), etc.

Moreover, in some embodiments, a differential filter 106A can be used for a period of time (at circle '3A') in which a smart filter 106B is being trained (at circle '4B').

For example, the smart filter 106B can be "shadow trained" by using feedback 116—e.g., results 114 from the ML model 108—along with the corresponding filtered input stream 112 elements provided by the differential filter 106A as training data for the smart filter 106B. At a later point in time—such as when the smart filter 106B training is deemed to be sufficient (e.g., via its accuracy passing a threshold)—the electronic device 102 can switch (completely at once, or over time) from use of the differential filter 106A to using the smart filter 106B at circle '5' to filter the data stream 110 elements into the filtered input stream 112 provided to the ML model 108. In some embodiments, the feedback 116 can be continually utilized to further refine the smart filter 106B, enabling it to continue becoming more adept at properly filtering the data stream 110 into only those elements that are extremely likely to be found "interesting" to the ML model 108.

Figure 2:
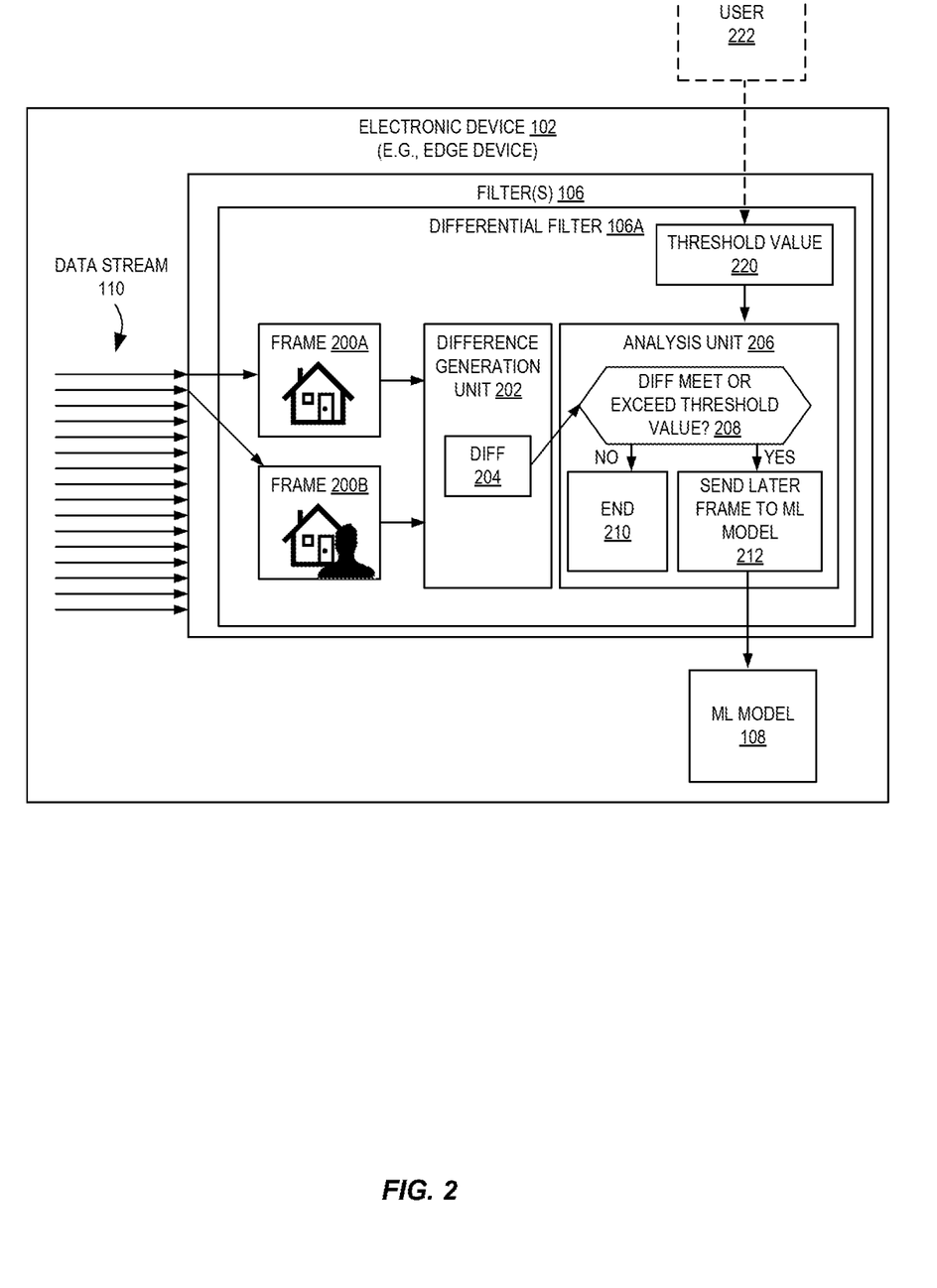
FIG. 2 is a diagram illustrating an edge electronic device utilizing an adaptable filter in the form of a differential filter for edge-based deep learning models according to some embodiments.

For further detail pertaining to the filters 106, FIG. 2 is a diagram illustrating an edge electronic device utilizing an adaptable filter in the form of a differential filter 106a for edge-based deep learning models according to some embodiments.

As introduced herein, a differential filter 106A can perform differential analysis to determine and analyze the difference between consecutive elements of a data stream 110. For example, in an embodiment where the input data stream 110 is a video stream, every element could be an image that can be represented in a matrix of vectors. Thus, difference generation unit 202 (e.g., implemented as a software module, hardware module, or combination thereof) of the differential filter 106A can perform a difference operation between a first frame 200A and a next frame 200B to find a difference 204 between the two frames. An analysis unit 206 (e.g., implemented as a software module, hardware module, or combination thereof) of the differential filter 106A can determine, at decision block 208, whether the difference 204 is higher than (e.g., meets or exceeds) a sensitivity threshold value 220 (that could be defined by a user 222). If so, the analysis unit 206 can determine that the electronic device 102 is to send the later frame on to be used as an input for the ML model 108 (at block 212) for inference; otherwise, the analysis unit 206 may halt processing of the particular pair of data stream elements (e.g., frames 200A-200B) and continue by analyzing another pair of consecutive frames (e.g., frame 200B and a non-illustrated frame 200C). Accordingly, in some embodiments, the generation of the data stream 110, the decision-making regarding whether elements of the data stream 110 are to be used for inference, and the actual inference operations via the ML model 108 can be locally-performed on a same electronic device 102, in contrast to existing systems that are not able to do this.

In various embodiments, a user 222 may flexibly be able to "tune" a threshold value 220 to be used based on the particular desires of the user 222, the particular environment of use, etc. For example, in some embodiments a user 222 can change threshold values 220 to be different for different "channels" of the input data stream 110—e.g., a particular Red Green Blue (RGB) channel can be made more sensitive in one type of electronic device compared to some other device where color channel sensitivity is not important. Thus, in some embodiments, a user 222 can modify the "sensitivity" of diffs and also the sensitivity of other elements, e.g., the color channels.

In some embodiments, a differential filter 106A can be straightforwardly constructed and deployed, yet result in a significant reduction in terms of the elements of the data stream 110 that were generated by the sensor(s) 104A-104B that are ultimately provided as the filtered input stream to the ML model.

Figure 3:
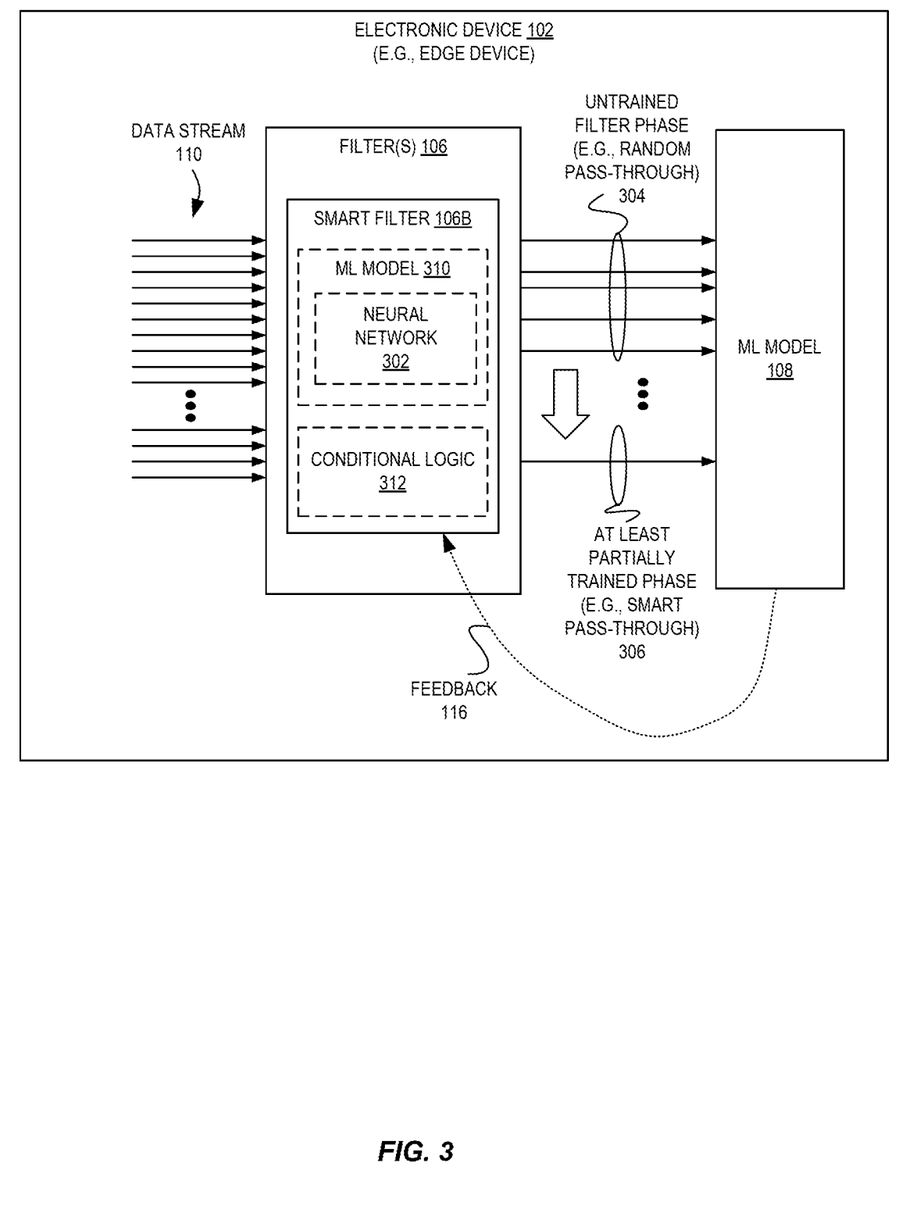
FIG. 3 is a diagram illustrating an edge electronic device utilizing an adaptable filter in the form of a smart filter for edge-based deep learning models according to some embodiments.

An edge electronic device 102 may also utilize a smart filter 106B. FIG. 3 is a diagram illustrating an edge electronic device 102 utilizing an adaptable filter in the form of a smart filter 106B for an edge-based deep learning ML model 108 according to some embodiments. As shown in FIG. 3, in some embodiments a smart filter 106B is a "deep" learning model such as a neural network (e.g., a Convolutional Neural Network (CNN)) that can be trained based on feedback 116 received from the ML model 108. Such a smart filter 106B can, in some cases, provide even more accurate filtering than the differential filter 106A described above, though a smart filter 106B may require time for training whereas a differential filter 106A may not require such efforts.

In some embodiments, a smart filter 106B can be deployed in two phases. In a first phase referred to as the untrained filter phase 304, the smart filter 106B may perform a random sampling of the data stream 110 (i.e., send some of the data stream 110 elements to the ML model 108 according to some algorithm, such as via a random pass-through or pass-through adhering to some defined pass-through percentage), resulting in a feedback 116 loop. Thus, based on the output of the machine learning model provided via feedback 116 (and the corresponding element of the data stream 110), the smart filter 106B can be trained and thus start "adjusting" itself to identify what types of elements of the data stream 110 the model 108 provides better predictions/inferences for. Thus, at a point in time or over a period of time, the electronic device 102 may switch to a second phase 306 (in which the smart filter 106B is at least partially trained begin) by using the smart filter 106B (via a "smart" pass-through) to determine which elements of the data stream 110 are provided to the ML model 108 as inputs.

Accordingly, in some embodiments this smart filter 106B can be model independent. Thus, the smart filter 106B does not need to know if it is working with an object detection model (or some other type of model)—instead, the smart filter 106B can just send random samples of the data stream 110 to the ML model 108, the ML model 108 will generate inferences (e.g., sets of predicted classes with corresponding confidence values) that allow the smart filter 106B to start learning. Over time, the smart filter 106B can thus determine particular characteristics or patterns of the data stream 110 that give "better" responses (e.g., including a predicted class with a high associated confidence value) from the model 108 via the feedback 116.

In some embodiments, the smart filter 106B comprises some conditional logic 312 or a ML model 310 (such as a neural network 302, which may be sufficiently lightweight so that it can be used by such electronic devices 102) that can be "generic" and thus able to be used in a variety of environments with a variety of models. Traditionally, ML models 310 such as neural network models are created to perform a specific function—e.g., detect places, faces, etc. However, in some embodiments, a ML model 310 used in a smart filter 106B can be a "generic" model that is independent of what primary ML model 108 a user will deploy, and can simply learn what is useful over time.

In addition to ease of deployment, some embodiments provide further benefits in terms of efficiency and accuracy. Once a smart filter 106B is trained and operational, the electronic device 102 in many cases no longer needs to expend energy to perform differences every frame (as in the differential filter 106A scenario), and in contrast the processing involved to determine whether to filter a frame (e.g., using a neural network 302) can utilize comparatively less energy/resources. Moreover, in some embodiments, a smart filter 106B may also be more accurate than differential filters, as its analysis is actually based on some patterns that are very relevant to the next-level model 108, as opposed to using differences that just detect that something is "different" between the frames, which may not at all be helpful—e.g., trees blowing in the wind may yield significantly different images from frame to frame; however, blowing trees would not be particularly useful for a ML model 108 that attempts to identify human faces. Additionally, over time the smart filter 106B tends to become more accurate in identifying those elements that are more capable of being "true" hits for the ML model 108, thus reducing the overall expense due to over-execution of the second model. Further, in various embodiments a smart filter 106B can be of varied complexity based on the characteristics of the electronic device 102 and thus, can be flexibly sophisticated based on the resources (e.g., power availability) of the device—e.g., a neural network 302 can utilize more layers when more power capability exists, allowing the neural network 302 to even further refine what is filtered.

Figure 4:
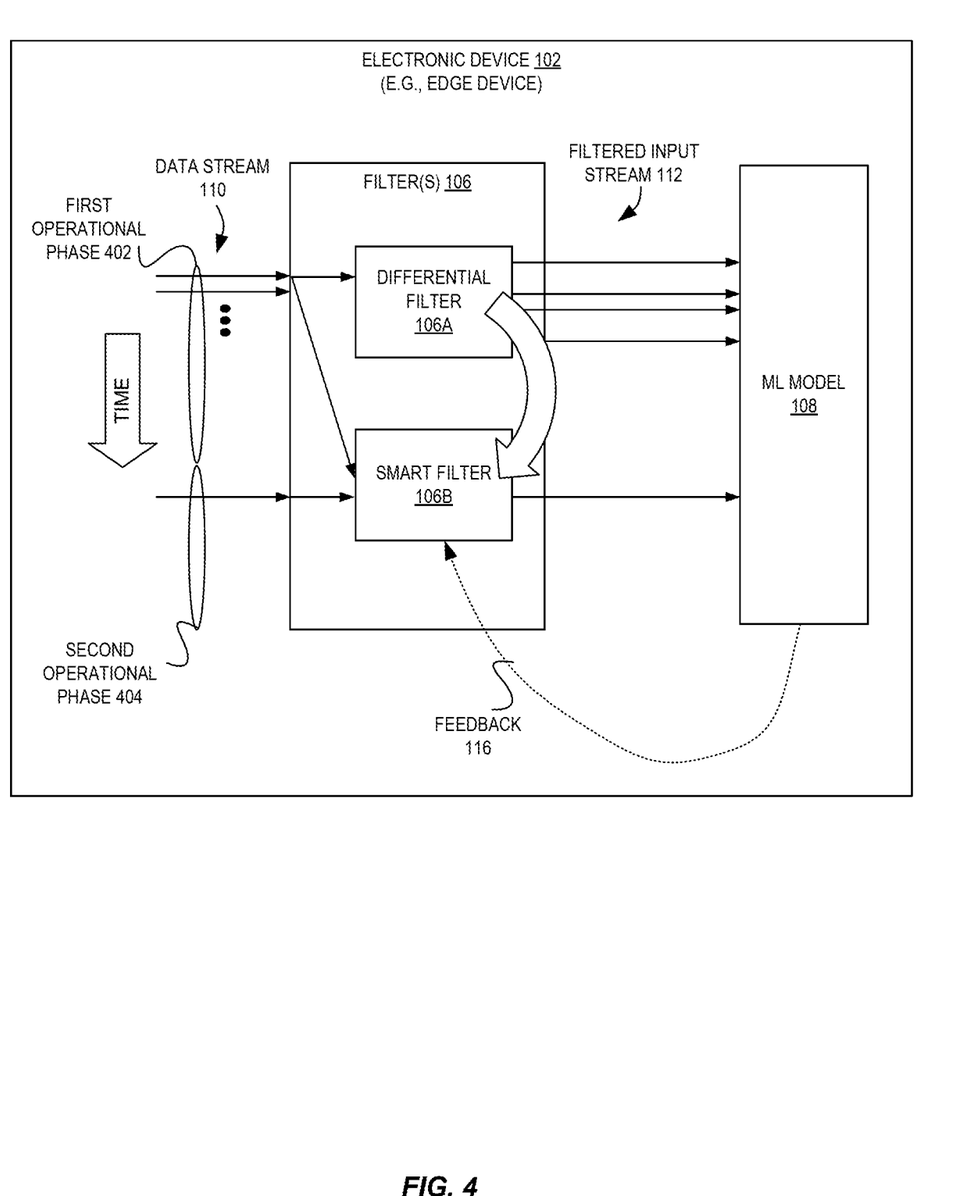
FIG. 4 is a diagram illustrating an edge electronic device utilizing an adaptable filter in the form of a differential filter and also a smart filter for edge-based deep learning models according to some embodiments.

Further yet, some embodiments can combine the benefits of both differential filters and smart filters. FIG. 4 is a diagram illustrating an edge electronic device utilizing an adaptable filter in the form of a differential filter and also a smart filter for edge-based deep learning models according to some embodiments. In some embodiments, a differential filter 106A and a smart filter 106B can be deployed together, such that during a first operational phase 402 the data stream 110 can immediately be filtered by a differential filter 106A (which requires no initial training time), and the filtered input stream 112 elements and the feedback 116 (resulting from the ML model 108 operating upon the filtered input stream 112 elements) can be used to train the smart filter 106B according to a shadow training type scheme. At some point in time—e.g., upon the smart filter 106B reaching a particular level of training (e.g., a particular accuracy), upon a configured amount of time passing, etc.—the electronic device 102 can switch into a second operational phase 404 by switching from using the differential filter 106B to instead use the smart filter 106B. The switch can occur all at once, i.e., before a point in time all data stream elements are filtered by the differential filter 106A, but after the point in time all arriving data stream elements are filtered by the smart filter 106B. However, in some embodiments, the switch may be gradual, and thus small amounts of the data stream 110 can slowly be shifted over time to instead use the smart filter 106B. For example, a particular percentage of the data stream elements can be shifted over time to the smart filter 106B—e.g., at a first time, 100% of the data stream is processed by the differential filter 106A, whereas at a second time, 90% of the data stream is processed by the differential filter 106A while 10% of the data stream is processed by the smart filter 106B, and so on. Although this approach can allow a newly-trained smart filter 106B to slowly be put into operation, in other embodiments while the differential filter 106A is operating each data stream 110 element can also be provided to the smart filter 106B to thus test the efficacy of that filter before ever needing to give the smart filter 106B complete filtering responsibility for any data stream elements.

Figure 5:
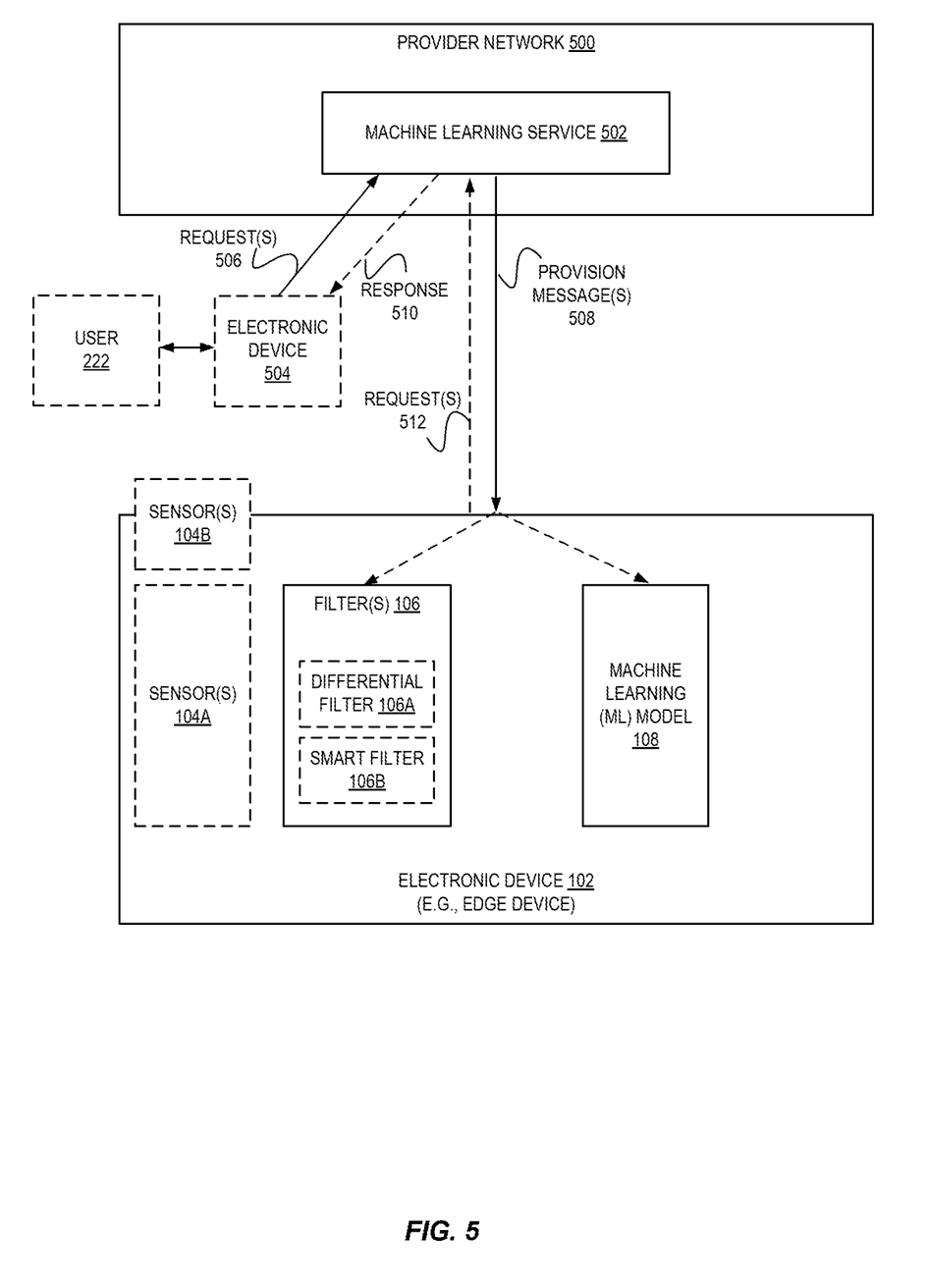
FIG. 5 is a diagram illustrating provisioning of a filter and a ML model by a provider network according to some embodiments.

The filter(s) 106 and ML models 108 can be configured and/or deployed to edge electronic devices 102 in a variety of ways. For example, FIG. 5 is a diagram illustrating the provisioning of a filter 106 and a ML model 108 by a provider network 500 according to some embodiments.

In some embodiments, training of the ML model 108 may be performed by a machine learning service 502 offered within a provider network 500, and the model 108 and/or filter(s) 106 may be deployed (or provided) by the machine learning service 502. Generally, a provider network 500 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, etc. The users (or "customers") of provider networks 500 may utilize one or more user accounts that are associated with a customer account, though these terms may be used somewhat interchangeably depend ending upon the context of use. Users may interact with a provider network 500 across one or more intermediate networks (e.g., the internet) via one or more interface(s), such as through use of application programming interface (API) calls, via a console implemented as a website or application, etc. The interface(s) may be part of, or serve as a front-end to, a control plane of the provider network 500 that includes "backend" services supporting and enabling the services that may be more directly offered to customers.

To provide these and other computing resource services, provider networks 150 typically rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the service provider system to perform a variety of computing tasks, or may indirectly utilize a compute instance by submitting code to be executed by the service provider system, which in turn utilizes a compute instance to execute the code (typically without the user having any control of or knowledge of the underlying compute instance(s) involved).

Thus, a machine learning service 502 may train models (e.g., on behalf of users) using a model training engine, which may be implemented using one electronic device or a group or "cluster" of electronic devices. For example, a model training engine may execute as one or more containers within one or more VMs, and the training may be performed in parallel using multiple containers, VMs, and/or electronic host devices. The training may involve the use of training data that is obtained and provided to the model training engine. For example, different streams of sensor data (e.g., image data, audio data, temperature data, etc.) from various sensors or data repositories may be provided to the model training engine, or stored/persisted and then later provided to the model training engine 206, etc. The model training engine can train a model (e.g., ML model 108) using techniques known to those of skill in the art, e.g., using particular machine learning algorithms, parameters, etc. For example, training data can be run through a set of layers corresponding to a particular sensor or type of sensor (that provided or is otherwise associated with the training data), which can be used to train squeeze layers, one or more predication layer(s), etc., to ultimately yield a model. In some embodiments, other layers may also be utilized based on the particular type of models being trained, the amount and/or types of sensors or stream data involved, etc.

A user 222 can, in some embodiments, utilize an electronic device 504 to issue one or more requests 506 (e.g., HyperText Transfer Protocol (HTTP) request messages) to an endpoint of a provider network 500 to configure and/or deploy filter(s) 106 and/or ML models 108. For example, in some embodiments when a user wants to deploy a model 108 (e.g., a custom model trained by the user—possibly using a machine learning service 502, or a "generic" model available in a library of models offered by a machine learning service 502), the user 222 may interact with the provider network 500 using a model deployment user interface (UI) with one or more UI elements (e.g., checkboxes) that can be selected, indicating that the user wishes to have one or more filters 106 deployed with the model 108. For example, if the user 222 uses the UI elements(s) to indicate a desire for smart filtering to be deployed, the provider network 500 can prepopulate a smart filter (e.g., a ML model such as a neural network, or other type of conditional logic) to be deployed along with the desired ML model 108 to a target device. Likewise, the user 222 can indicate a request for a differential filter, or a combination of a differential filter and smart filter, etc. Thereafter, the machine learning service 502 may be able to directly provision (via one or multiple provision message(s) 508, which may be sent in response to one or more request 512 messages sent by the electronic device 102 as part of a connection between the electronic device 102 and the provider network 500) the ML model 108 and/or filter(s) 106 to the electronic device, or provide the user 222 (via response(s) 510) information (e.g., URLs and/or credentials) allowing the user 222 (or the electronic device 102) to obtain the ML model 108 and/or filter(s) 106.

Figure 6:
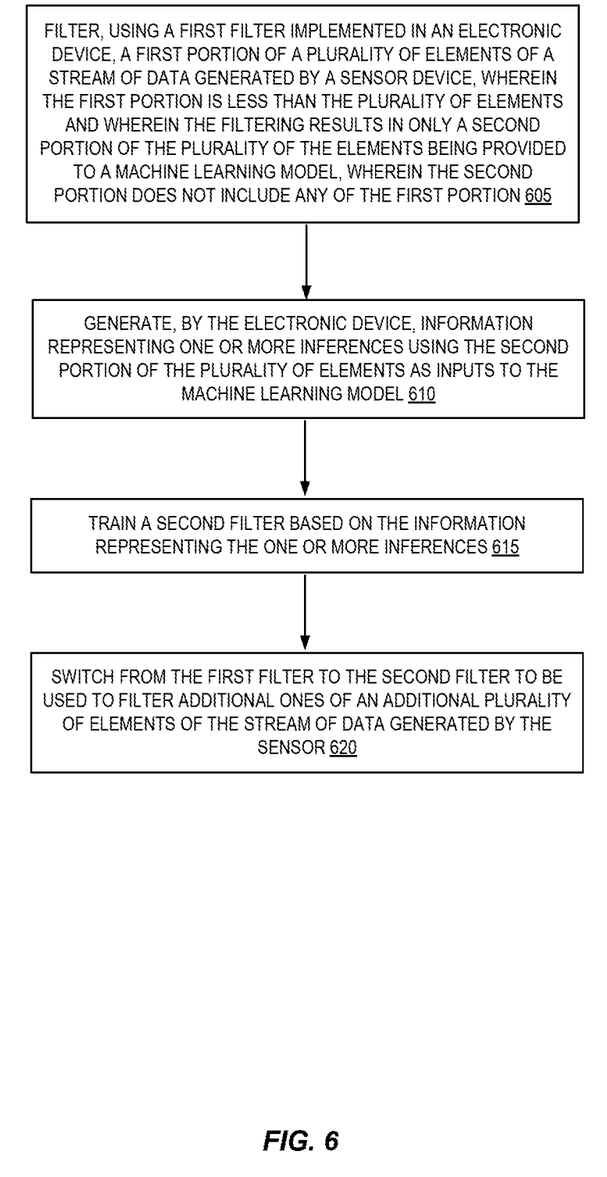
FIG. 6 is a flow diagram illustrating operations involving adaptable filtering of elements of data streams for edge-based deep learning models according to some embodiments.

FIG. 6 is a flow diagram illustrating operations involving adaptable filtering of elements of data streams for edge-based deep learning models according to some embodiments.

Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by electronic device 102 of the other figures.

The operations 600 include, at block 605, filtering, using a first filter implemented in an electronic device, a first portion of a plurality of elements of a stream of data generated by a sensor device. The first portion is less than the plurality of elements, and the filtering results in only a second portion of the plurality of the elements being provided to a machine learning model. The second portion does not include any of the first portion.

The first filter may be a differential filter which determines differences between successive elements of the stream of data, and determines whether a value representing each difference satisfies (e.g., is a greater than or equal to) a defined threshold value. When a difference does satisfy the defined threshold, the corresponding data stream element is provided as an input for the machine learning model; otherwise, the corresponding data stream element may be dropped or "filtered." The threshold value may be defined by a user, and the threshold may apply to particular portions of the data stream, such as a color channel of each image, etc.

In some embodiments, the plurality of elements of the stream of data are generated by the sensor device at a first rate, while the electronic device is able to generate inferences using the machine learning model at a second rate that is less than the first rate. In some embodiments, the filtering results in the second portion of the plurality of elements being provided to the machine learning model for at least a period of time at a rate that is less than or equal to the second rate (at which the electronic device is able to generate information representing inferences).

In some embodiments, the sensor device comprises an optical sensor, the stream of data comprises frames generated by the optical sensor, and the sensor device is coupled with the electronic device over one or more buses. In some embodiments, the first filter, the second filter, and/or the machine learning model are received at a network interface of the electronic device, e.g., as part of a provisioning performed by a provider network (or machine learning service) on behalf of a user.

At block 610, the operations 600 include generating, by the electronic device, information representing one or more inferences using the second portion of the plurality of elements as inputs to the machine learning model. The information representing an inference may include, for example, one or more predicted/inferred classes each having an associated confidence value, though in other cases the information may be of different types and/or values based on the particular type of machine learning model involved as is known to those of skill in the art. The one or more inferences can cause the electronic device to perform one or more responsive actions, such as notifying a user, transmitting a message to another electronic device (in a local network, or in a remote network such as a provider network, etc.), generating an audio and/or visual alert, storing a record of the corresponding data stream elements, etc. In some embodiments, the information representing the one or more inferences is provided as feedback to a second filter.

The operations 600 include, at block 615, training a second filter based on the information representing the one or more of inferences. In some embodiments, the second filter includes a "smart filter" that is another ML model, such as a neural network. This ML model may be selected based on the characteristics of the electronic device, e.g., a "large" model such as a large multi-layer neural network may not be appropriate for certain types of electronic devices (e.g., due to limited computational or energy resources) although such a model may work in a different device (e.g., having different resources). The second filter can be trained using the information representing the one or more inferences and the corresponding one or more data stream elements (used by the ML model to generate the information) in the filtered input stream to identify characteristics of those of the plurality of data stream elements that resulted in a "strong" inference.

At block 620, the operations 600 include switching from the first filter to the second filter to be used to filter additional ones of an additional plurality of elements of the stream of data generated by the sensor. In some embodiments, block 620 is performed upon the second filter reaching a particular threshold in terms of training completion, such as an accuracy rate, amount of elapsed time, etc.

Figure 7:
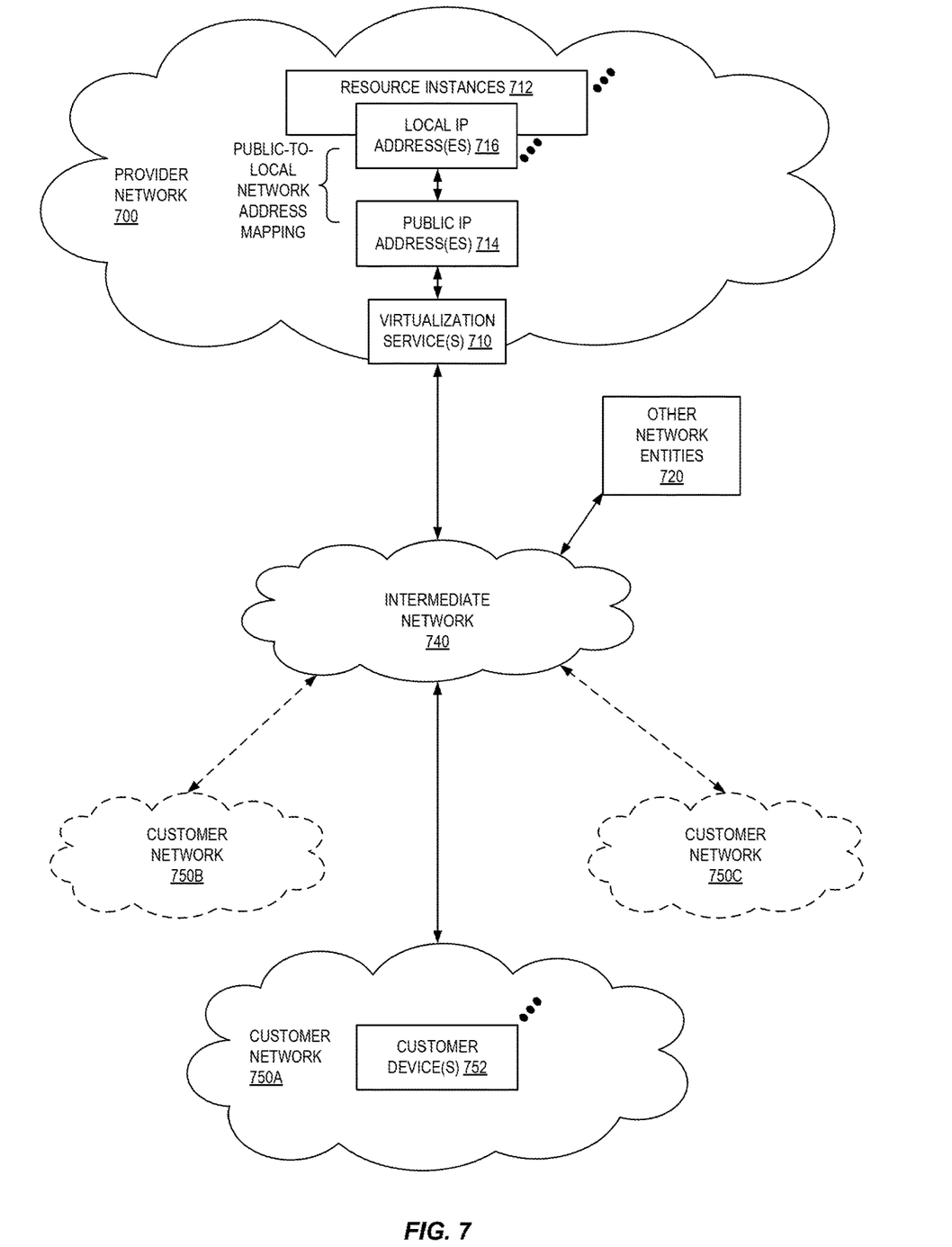
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local IP addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
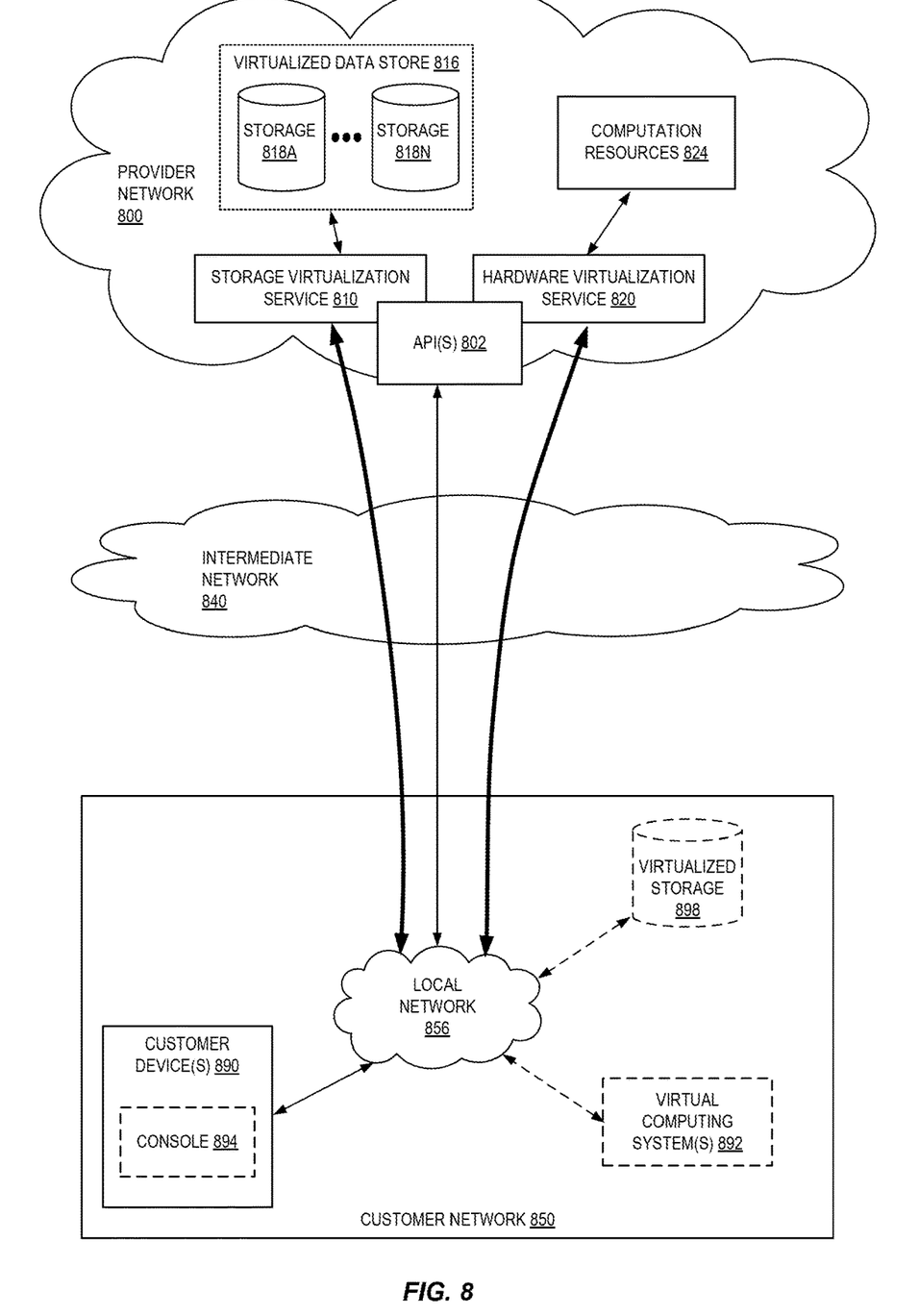
FIG. 8 is a block diagram of an example provider network that provides a storage virtualization service and a hardware virtualization service to customers according to some embodiments.

FIG. 8 is a block diagram of an example provider network that provides a storage virtualization service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage virtualization service 810, for example via one or more APIs 802, to access data from and store data to storage resources 818A-818N of a virtual data store 816 provided by the provider network 800. In some embodiments, a virtualized data store gateway (not shown) may be provided at the customer network 850 that may locally cache at least some data, for example frequently accessed or critical data, and that may communicate with virtualized data store service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes, which appear to the user as local virtualized storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
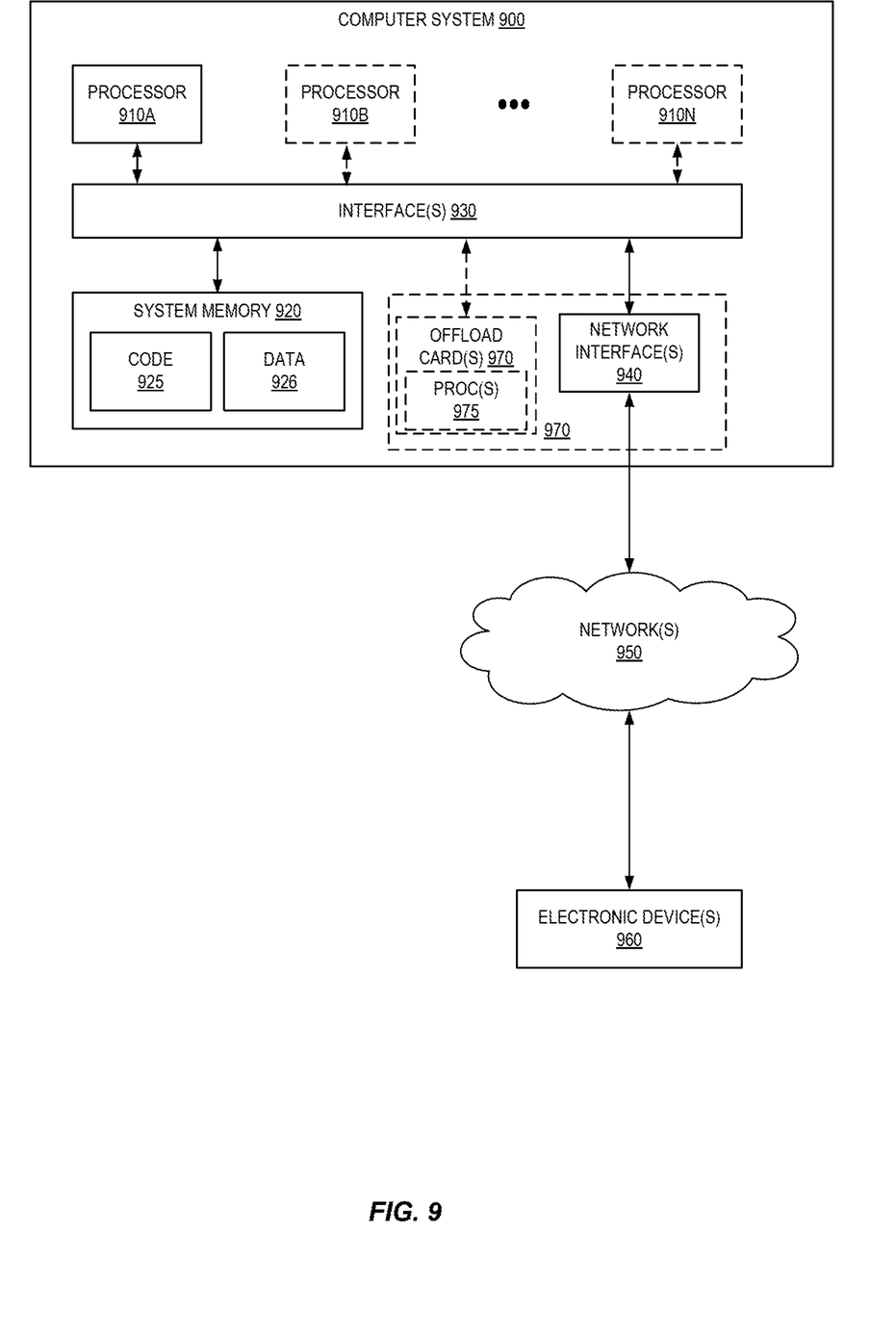
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the ×86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities, and may not coordinate with (or service) any hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle(R), Microsoft(R), Sybase(R), IBM(R), etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 104A-104B, 106A-106B) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   filtering, using a differential filter implemented at an edge electronic device, a first stream of video data generated by a sensor device of or coupled with the edge electronic device to produce a first filtered stream of video data;
   generating, using a machine learning model at the edge electronic device, a first set of predicted classes with corresponding confidence values using the first filtered stream of video data as input to the machine learning model;
   training a smart filter based at least in part on the first set of predicted classes with corresponding confidence values;
   determining that an accuracy of the trained smart filter passes an accuracy threshold;
   switching, by the edge electronic device, from the first differential filter to the trained smart filter to filter video data generated by the sensor device;
   filtering, using the trained smart filter at the edge electronic device, a second stream of video data generated by the sensor device to produce a second filtered stream of video data; and
   generating, using the machine learning model, a second set of predicted classes with corresponding confidence values using the second filtered stream of video data as input to the machine learning model.

2. The computer-implemented method of claim 1, wherein:
   the sensor device comprises an optical sensor.

3. The computer-implemented method of claim 1, wherein the first filter filters the first stream of data according to a random pass-through algorithm or a percentage-based pass-through algorithm.

4. The computer-implemented method of claim 1, wherein the machine learning model comprises a neural network model trained for object detection.

5. The computer-implemented method of claim 1, wherein the accuracy threshold is user-specified.

6. A computer-implemented method comprising:
   filtering, using a first filter at an electronic device, a first stream of data generated by a sensor device to produce a first filtered stream of data, the sensor device of or operatively coupled to the electronic device;
   generating, using a machine learning model at the electronic device, a first set of inferences based on providing the first stream of data as input to the machine learning model;
   training a second filter based at least in part on the first set of inferences;
   determining that an accuracy of the trained second filter passes an accuracy threshold; and
   switching, by the electronic device, to use the trained second filter in place of the first filter for use in filtering data generated by the sensor device.

7. The computer-implemented method of claim 6, wherein:
   the first stream of data comprises a first element and a second element; and
   filtering, using the first filter at the electronic device, the first stream of data generated by the sensor device to produce the first filtered stream of data comprises determining a difference value based on the first element and the second element, the difference value representing a difference between the first element and the second element, and determining not to include the second element in the first filtered stream of data based on the difference value exceeding a difference threshold.

8. The computer-implemented method of claim 7, wherein the difference threshold is configured by a user.

9. The computer-implemented method of claim 6, wherein:
   the first stream of data comprises a first plurality of elements;
   the sensor device generates the first plurality of elements at a first rate;
   the first filtered stream of data comprises a second plurality of elements;
   the second plurality of elements is a subset of the first plurality of elements; and
   the first set of predicted classes and corresponding confidence values are generated by the machine learning model for the second plurality of elements based on providing the second plurality of elements as input to the machine learning model at a second rate that is less than the first rate.

10. The computer-implemented method of claim 6, wherein:
    training the second filter is performed by a machine learning service; and
    the method further comprises the electronic device receiving the trained second filter from the machine learning service.

11. The computer-implemented method of claim 6, wherein:
the sensor device comprises an optical sensor; and
the first stream of data comprises video frames generated by the optical sensor.

12. The computer-implemented method of claim 6, further comprising:
receiving, at a network interface of the electronic device, the first filter and the machine learning model.

13. The computer-implemented method of claim 6, wherein the first filter filters the first stream of data according to a random pass-through algorithm or a percentage-based pass-through algorithm.

14. The computer-implemented method of claim 6, wherein the machine learning model comprises a neural network model trained for object detection.

15. A system comprising:
an electronic device comprising:
a sensor device configured to generate a stream of data;
one or more processors; and
a memory storing instructions which, when executed by the one or more processors, cause the electronic device to:
filter, using a first filter at the electronic device, a first stream of data generated by the sensor device to produce a first filtered stream of data;
generate, using a machine learning model at the electronic device, a first set of inferences based on providing the first filtered stream of data as input to the machine learning model;
receive, at the electronic device, a trained second filter from a machine learning service; and
switch to using the trained second filter at the electronic device in place of the first filter;
one or more computing devices to implement the machine learning service, the machine learning service including instructions that when executed cause the machine learning service to:
train a second filter based at least in part on the first filtered stream of data and the first set of inferences to generate the trained second filter;
determine that an accuracy of the trained second filter passes an accuracy threshold; and
transmit the trained second filter to the electronic device.

16. The system of claim 15, wherein:
the first stream of data comprises a first element and a second element;
the memory further stores instructions which, when executed by the one or more processors, causes the electronic device to determine a difference value based on the first element and the second element;
the difference value represents a difference between the first element and the second element, and
the memory further stores instructions which, when executed by the one or more processors, causes the electronic device to determine not to include the second element in the first filtered stream of data based on the difference value exceeding a difference threshold.

17. The system of claim 15, wherein:
the first stream of data comprises a first plurality of elements;
the sensor device is configured to generate the first plurality of elements at a first rate;
the first filtered stream of data comprises a second plurality of elements;
the second plurality of elements is a subset of the first plurality of elements; and
the memory further stores instructions which, when executed by the one or more processors, causes the electronic device to generate the first set of inferences for the second plurality of elements using the machine learning model based on providing the second plurality of elements as input to the machine learning model at a second rate that is less than the first rate.

18. The system of claim 15, wherein:
the electronic device operates on battery power.

19. The system of claim 15, wherein the first filter is configured to filter the first stream of data according to a random pass-through algorithm or a percentage-based pass-through algorithm.

20. The system of claim 15, wherein the machine learning model comprises a neural network model trained for object detection.

* * * * *